United States Patent
Summers et al.

(10) Patent No.: US 7,056,856 B2
(45) Date of Patent: *Jun. 6, 2006

(54) TIN OXIDE EXHAUST CATALYST SUPPORTS AND CATALYSTS STABLE AT HIGH TEMPERATURES

(75) Inventors: Jerry C. Summers, Charleston, WV (US); Suresh T. Gulati, Elmira, NY (US)

(73) Assignee: Airflow Catalyst Systems, Inc., Rochester, NY (US)

( * ) Notice: Subject to any disclaimer, the term of this patent is extended or adjusted under 35 U.S.C. 154(b) by 55 days.

This patent is subject to a terminal disclaimer.

(21) Appl. No.: 10/237,844

(22) Filed: Sep. 9, 2002

(65) Prior Publication Data
US 2004/0048740 A1   Mar. 11, 2004

(51) Int. Cl.
*B01J 23/00* (2006.01)
(52) U.S. Cl. .................. 502/302; 502/355; 502/349
(58) Field of Classification Search ............... 502/302, 502/303, 304, 325, 332, 333, 334, 339, 349, 502/352, 355
See application file for complete search history.

(56) References Cited

U.S. PATENT DOCUMENTS

| 4,056,489 | A | * | 11/1977 | Hindin et al. ............... 502/257 |
|---|---|---|---|---|
| 4,220,559 | A | * | 9/1980 | Polinski ...................... 502/250 |
| 4,536,375 | A | * | 8/1985 | Holt et al. ................... 423/247 |
| 4,581,343 | A | * | 4/1986 | Blanchard et al. ........... 502/241 |
| 4,829,035 | A | | 5/1989 | Upchurch et al. |
| 4,855,274 | A | | 8/1989 | Upchurch et al. |
| 4,912,082 | A | | 3/1990 | Upchurch et al. |
| 5,024,984 | A | * | 6/1991 | Kaminsky et al. .......... 502/303 |
| 2003/0092562 | A1 | * | 5/2003 | Nakanishi et al. ............ 502/65 |
| 2003/0139290 | A1 | * | 7/2003 | Jordan et al. ................ 502/344 |
| 2003/0144143 | A1 | * | 7/2003 | Jordan et al. ................ 502/330 |

* cited by examiner

*Primary Examiner*—Jonathan Johnson
(74) *Attorney, Agent, or Firm*—Neil L. Slifkin; Robert C. Brown

(57) ABSTRACT

A tin-oxide based three-way catalytic material employing precious metals that is stable at exhaust gas temperatures of internal combustion engines when the tin oxide lattice includes any of several rare earth oxide stabilizers in the lanthanide series. The rare-earth elements are the 15 lanthanide elements with atomic numbers 57 through 71 that are in Group IIIA of the Periodic Table: lanthanum, cerium, praseodymium, neodymium, promethium, samarium, europium, gadolinium, terbium, dysprosium, holmium, erbium, thulium, ytterbium, and lutetium. Such tin-oxide based catalytic materials may also beneficially include zirconium oxide and/or yttrium oxide. The invention is useful in providing three-way catalytic exhaust converters for internal combustion engines.

5 Claims, No Drawings

TIN OXIDE EXHAUST CATALYST SUPPORTS AND CATALYSTS STABLE AT HIGH TEMPERATURES

BACKGROUND OF THE INVENTION

1. Field of the Invention

The present invention relates to materials for catalytically oxidizing hydrocarbons; more particularly, to so-called "three-way" materials for catalytically oxidizing hydrocarbons and carbon monoxide, and reducing nitrogen oxides; and most particularly, to three-way tin-oxide based catalytic systems capable of withstanding temperatures of exhaust gases from internal combustion engines.

2. Discussion of the Related Art

Catalysts based on tin oxide ($SnO_2$) and precious metals are well known in the art of catalysis, especially for low-temperature oxidation of carbon monoxide (CO) to carbon dioxide ($CO_2$) in the absence of $SO_2$ and in the presence of only trace amounts of water vapor. See, for example, U.S. Pat. Nos. 4,829,035; 4,855,274; and 4,912,082, the relevant disclosures of which are herein incorporated by reference, which disclose the manufacture and use of such catalysts for maintaining $CO_2$ levels in a $CO_2$ laser, wherein the $CO_2$ gas undergoes progressive degradation to CO during operation of the laser. Such catalysis proceeds at temperatures between about 23° C. and 100° C., the normal operating temperature range of a $CO_2$ laser.

It is further known in the art of precious metal tin oxide catalysts to include one or more "promoters" in a tin oxide-coated substrate. Such promoters can permit large reductions in the amount of precious metal required for desired catalytic activity. For example, U.S. Pat. No. 6,132,694, herein incorporated by reference and referred to as '694, discloses that when no promoter is employed, the catalyst may comprise about 85% tin oxide and up to 15% platinum. When a promoter is employed at a level of about 3 atom percent to tin metal, especially good catalysis is observed at platinum loading of only 1–2% relative to the tin oxide. The promoters disclosed and claimed are all oxides of transition metals such as iron, manganese, copper, cobalt, and nickel.

Precious metal catalysts are widely known for use in catalytically modifying exhaust gases from internal combustion engines, especially in vehicular applications. So-called "three-way" catalysts are able to oxidize CO to $CO_2$, to oxidize hydrocarbons to $CO_2$ and $H_2O$, and reduce nitrogen oxides to $N_2$. Tin oxide is especially attractive as a component of a three-way exhaust catalysis system because of a high inherent oxygen storage capacity. A serious problem exists, however, in applying prior art tin-oxide based catalytic systems to automotive uses. At the relatively high temperatures dictated by engine exhaust, generally between about 500° C. and 1000° C., the structure of tin oxide is seriously affected, as measured by the Brunauer/Emmett/Teller (BET) surface area. The BET surface area is important because it has a major role in controlling the dispersion of the catalytically-active precious or "noble" metal component. Having a high precious-metal dispersion ensures a high level of catalytic activity. As the tin oxide structure loses surface area, the number of catalytic sites decreases due to precious metal sintering, and catalytic activity is diminished. Consequently, tin oxide in any form has not been commercially adapted heretofore in automotive catalyst systems.

What is needed is a means for stabilizing tin oxide structure at high temperatures to permit use of tin-oxide based catalytic systems on internal combustion engine exhaust gases.

OBJECTS OF THE INVENTION

It is a principal object of the invention to reduce the cost of internal combustion engine catalytic converters by adapting stabilized tin-oxide based systems for the purpose.

It is a further object of the invention to improve the effectiveness of internal combustion engine catalytic converters by adapting stabilized tin-oxide based systems for the purpose.

BRIEF DESCRIPTION OF THE INVENTION

Briefly described, three-way tin-oxide based catalytic materials employing precious metals are stable at exhaust gas temperatures of internal combustion engines when the tin oxide lattice includes hafnium and/or any of several rare earth oxide components in the lanthanide series, for example, oxides of La, Pr, and Nd. The rare-earth elements (REE) are the 15 lanthanide elements with atomic numbers 57 through 71 that are in Group IIIA of the Periodic Table: lanthanum, cerium, praseodymium, neodymium, promethium, samarium, europium, gadolinium, terbium, dysprosium, holmium, erbium, thulium, ytterbium, and lutetium. Such tin-oxide based catalytic materials may also beneficially include zirconium oxide and/or yttrium oxide. The invention is useful in providing three-way catalytic exhaust converters for internal combustion engines.

DETAILED DESCRIPTION OF THE INVENTION

As noted above, tin-oxide based precious metal catalysts in accordance with the prior art are excellent low temperature catalysts but lack the thermal stability required for automotive exhaust uses. We have found surprisingly that replacing or supplementing with rare earth oxides the transition metal oxide promoters disclosed in the incorporated '694 reference provides a high degree of thermal stability as measured by BET surface area in the range of temperatures required for automotive uses.

Stabilized tin-oxide powders may be formed directly by direct precipitation from solution. In a first preferred method, tin metal is dissolved in aqueous nitric acid. An aqueous solution of a soluble salt, such as a nitrate, of a rare earth, cerium, zirconium, or and/or hafnium is added with mixing to the tin solution. Preferably, an inert material having a high BET surface area, such as aluminum oxide, is added to the solution, permitting the stabilized tin compounds to be precipitated directly onto a high surface area substrate. The solution is titrated with aqueous ammonia, causing stabilized tin and rare earth salts to coprecipitate. The salts are recovered by filtration, dried in ambient air, and calcined at 500° C. to yield a stabilized powder of high-BET material covered with coprecipitated tin oxide and transition and/or rare earth oxide, the percentage of the latter being preferably between about 2 weight percent and about 14 weight percent, and most preferably between about 4 weight percent and 8 weight percent with respect to tin oxide.

Although the above is a currently preferred method for making stabilized tin oxide powders, other methods as may occur to those of ordinary skill in the arts are within the scope of the invention. Catalysts may then be prepared by a variety of coating processes, including slurry and sol gel methods. In a first and preferred method, an aqueous slurry of tin oxide coprecipitate is coated conventionally as a washcoat or undercoat to a conventional high surface area inert support structure such as granules, pellets, honeycomb monoliths, fabrics, or rigid foams. A plurality of washcoats may be applied successively, as needed. Active precious or noble metal salts, for example, tetraamine palladium dihydroxide, palladium chloride, chloroplatinic acid, platinum nitrate, rhodium nitrate, rhodium chloride, and the like, may be included in the washcoat slurry but preferably are overcoated on the dried washcoat from an aqueous solution, as described in the incorporated references. Suitable noble metals can include platinum, palladium, gold, silver, ruthenium, iridium, and rhodium.

In a second method for forming a catalyst, the above mixture of oxidized tin rare earth salt solution, with or without a high BET surface area material, may be mixed with the precious metal salt solution, coprecipitated directly onto the final support structure, and calcined in situ to provide the final catalytic element.

EXAMPLE 1

A tin-oxide based powder was prepared by precipitation and calcining as described above but with no stabilizer and was conditioned at 950° C. for 4 hours to simulate aging of a catalyst under automotive use conditions. The resulting BET surface area was 5.7 $m^2/g$.

EXAMPLE 2

A tin-oxide based powder was prepared and conditioned as in Example 1 but also included between 4 weight percent and 8 weight percent of a mixture of rare earth oxides (La, Pr, Nd, and Ce) plus yttrium oxide. The resulting BET surface area was between 10.4 and 17.5 $m^2/g$.

EXAMPLE 3

A tin-oxide based powder was prepared and conditioned as in Example 1 but also included between 4 weight percent and 8 weight percent of a mixture of oxides of La, Y, and Zr without Ce. The resulting BET surface area was between 22.9 and 30.4 $m^2/g$.

It is seen that stabilizing a tin-oxide based catalyst using combinations of rare earth oxides, yttrium oxide, and zirconium oxide can provide a several-fold increase in residual unit surface area of the powder after prolonged exposure to extremely high temperatures, thus potentially also increasing several-fold the areal dispersion of precious metal sites. Although not presented here as proven fact, the inventors believe that the comparatively high residual BET surface area is attributed to increased stability of the tin oxide three-dimensional structure afforded by inclusion of the rare earth oxides in the lattice structure of the tin oxide.

Tin oxide may also be coprecipitated with zirconium oxide and stabilized with lanthanum or yttrium oxide. The resulting BET surface area may be between 22.9 and 30.4 $m^2/g$, comparable to that seen in Example 3.

From the foregoing description it will be apparent that there has been provided an improved three-way catalyst and catalyst washcoat wherein the structure of tin oxide is thermally stabilized by incorporation of rare earth oxides into the washcoat. Variations and modifications of the herein described catalyst, in accordance with the invention, will undoubtedly suggest themselves to those skilled in this art. Accordingly, the foregoing description should be taken as illustrative and not in a limiting sense.

The invention claimed is:

1. A chemical composition for supporting noble metal in an exhaust catalyst, said composition comprising tin oxide, zirconium oxide, cerium oxide, and lanthanum oxide.

2. A composition in accordance with claim 1 wherein said composition is suitable as a wash coat for subsequently receiving said noble metal to form said catalyst.

3. A composition in accordance with claim 1 further comprising an inert material having a high BET surface area.

4. A composition in accordance with claim 3 wherein said inert material includes aluminum oxide.

5. An exhaust gas catalyst, comprising a composition including tin oxide, zirconium oxide, cerium oxide, lanthanum oxide, and a noble metal selected from the group consisting of platinum, palladium, gold, silver, ruthenium, iridium, rhodium, and combinations thereof.

* * * * *